United States Patent
Wei (10) Patent No.: US 9,115,766 B2
(45) Date of Patent: Aug. 25, 2015

(54) COUPLING MODULE OF WINDOW COVERING

(71) Applicant: NIEN MADE ENTERPRISE CO., LTD., Taichung (TW)

(72) Inventor: Shui-Dong Wei, Taichung (TW)

(73) Assignee: NIEN MADE ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 14/337,842

(22) Filed: Jul. 22, 2014

(65) Prior Publication Data

US 2015/0041276 A1  Feb. 12, 2015

(30) Foreign Application Priority Data

Aug. 9, 2013 (CN) ...................... 2013 2 0485239 U (51) Int. Cl.
  *E06B 9/262* (2006.01)
  *F16D 11/16* (2006.01)

(52) U.S. Cl.
  CPC ................. *F16D 11/16* (2013.01); *E06B 9/262* (2013.01); *E06B 2009/2625* (2013.01)

(58) Field of Classification Search
  USPC ............................. 160/84.06, 84.02, 275–288
  IPC ............................. E06B 2009/2625, 2009/2627
  See application file for complete search history.

(56) References Cited

U.S. PATENT DOCUMENTS

| | | | | | |
|---|---|---|---|---|---|
| 1,887,646 | A | * | 11/1932 | Johnston | 160/243 |
| 4,807,686 | A | * | 2/1989 | Schnebly et al. | 160/84.02 |
| 4,890,354 | A | * | 1/1990 | Cooper | 16/87 R |
| 4,945,969 | A | * | 8/1990 | Schnebly et al. | 160/84.02 |
| 5,141,041 | A | * | 8/1992 | Katz et al. | 160/84.02 |
| 6,024,154 | A | * | 2/2000 | Wang et al. | 160/170 |
| 6,186,211 | B1 | * | 2/2001 | Knowles | 160/84.02 |
| 6,644,375 | B2 | * | 11/2003 | Palmer | 160/170 |
| 6,748,999 | B2 | * | 6/2004 | Churchfield | 160/288 |
| 2012/0227912 | A1 | * | 9/2012 | Anderson et al. | 160/87 |

* cited by examiner

*Primary Examiner* — David Purol
(74) *Attorney, Agent, or Firm* — Ming Chow; Sinorica, LLC (57) ABSTRACT

A coupling module of a covering includes an elongated main member, a coupling device, and an adjusting unit. The elongated main member has an axial direction and a radial direction, and has a stop wall at one end thereof. The coupling device is movably connected to the main member, and the adjusting unit is connected to the coupling device to move the coupling device between a first position and a second position, wherein the coupling device is moved in a direction parallel to the radial direction, and a distance between the coupling device and the stop wall when the coupling device is at the first position is shorter than that between coupling device and the stop wall when the coupling device is at the second position.

7 Claims, 9 Drawing Sheets

COUPLING MODULE OF WINDOW COVERING

The current application claims a foreign priority to the patent application of China No. 201320485239.3 filed on Aug. 9, 2013.

BACKGROUND OF THE INVENTION

1. Technical Field

The present invention relates to a door or a window, and more particularly to a covering device for a door or a window, and a coupling module of the covering device.

2. Description of Related Art

Typically, there are many openings in a building for people walking through, ventilation, or for light coming into the building. Take an opening on the exterior wall for example, a window usually is installed in the opening to open or close the opening, isolating heat, or shading. Except the window, a window covering should be installed in the opening. The conventional window covering is firmly mounted on the wall besides the opening. Sometime the window covering is needed to be cleaned. It is not an easy job to take the covering off from the wall once the window covering is mounted.

BRIEF SUMMARY OF THE INVENTION

In view of the above, the primary objective of the present invention is to provide a coupling module of a window covering, which provides an easy way to install and uninstall the window covering.

In order to achieve the objective of the present invention, a coupling module of a covering includes an elongated main member, a coupling device, and an adjusting unit. The elongated main member has an axial direction through opposite ends thereof and a radial direction perpendicular to the axial direction, and has a stop wall at one of the opposite ends thereof, wherein the stop wall has a first stop surface. The coupling device is movably connected to the main member and has a second stop surface facing the first stop face of the main member. The adjusting unit connecting to the coupling device to move the coupling device between a first position and a second position, wherein the coupling device is moved in a direction parallel to the radial direction, and a distance between the first stop surface and the second stop surface when the coupling device is at the first position is shorter than that between the first stop surface and the second stop surface when the coupling device is at the second position.

In an embodiment, the main member has a hollow portion therein and a bore on the end thereof, and the bore is communicated with the hollow portion; the coupling device is received in the hollow portion of the main member and has an acting portion extending out of the main member via the bore; the acting portion has the second stop surface.

In an embodiment, the main member includes a frame and a lid; the frame has the hollow portion, and the lid is connected to an end of the frame; the lid has a stop wall and the bore.

In an embodiment, the frame has a lateral bore communicated with the hollow portion; the adjusting unit has an operating member and a connecting member; the connecting member is received in the hollow portion of the frame, and the operating member is outside the frame and connected to the connecting member through the lateral bore; the operating member is reciprocated in a direction parallel to the radial direction of the main member to move the coupling device between the first position and the second position.

In an embodiment, the operating member has a through hole; the connecting member has a tube and a locker; the tube directly engages the coupling device, and the locker has an end connected to the tube and an opposite end engaging the through hole of the operating member through the lateral bore.

In an embodiment, the frame has an interior surface and an exterior surface; the lateral bore is open at both the interior surface and the exterior surface; the operating member has a first plate and a second plate; the first plate is outside the frame, and the second plate is received in the hollow portion of the frame; the second plate is connected to the first plate through the lateral bore; a length of the second plate is longer than a width of the lateral bore and shorter than a length of the lateral bore; the operating member is rotated related to the locker to engage and disengage the second plate with the lateral bore.

In an embodiment, the frame has an elongated lateral bore communicated with the hollow portion; the adjusting unit has an operating member, a base, and a connecting member; the operating member is outside the frame, the base is received in the hollow portion of the frame and connected to the coupling device, and the connecting member is received in the hollow portion of the frame and connected to the operating member through the lateral bore; the base has an inclined face, and the inclined face slopes toward the lid, so that a distance between the lateral bore and the inclined face gradually increases in a direction toward the lid; the connecting member rests against the inclined face; the operating member is reciprocated along the lateral bore to move the coupling device between the first position and the second position.

In an embodiment, the base has a base frame and a cover; the connecting member is received in the base frame, and the cover has the inclined face.

In an embodiment, the operating member has a through hole; the connecting member has a tube and a locker; the tube directly engages the coupling device, and the locker engages the through hole of the operating member through the lateral hole; the tube has an inclined face resting against the inclined face of the base.

In an embodiment, the tube has a tubular member and a post connected to the tubular member; the locker has a coupling bore to engage the post, and the tubular member has the inclined face.

With such design, the window with the shading member has all the functions as described above, and furthermore the shading member is able to be assembled or disassembled in an easy way.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
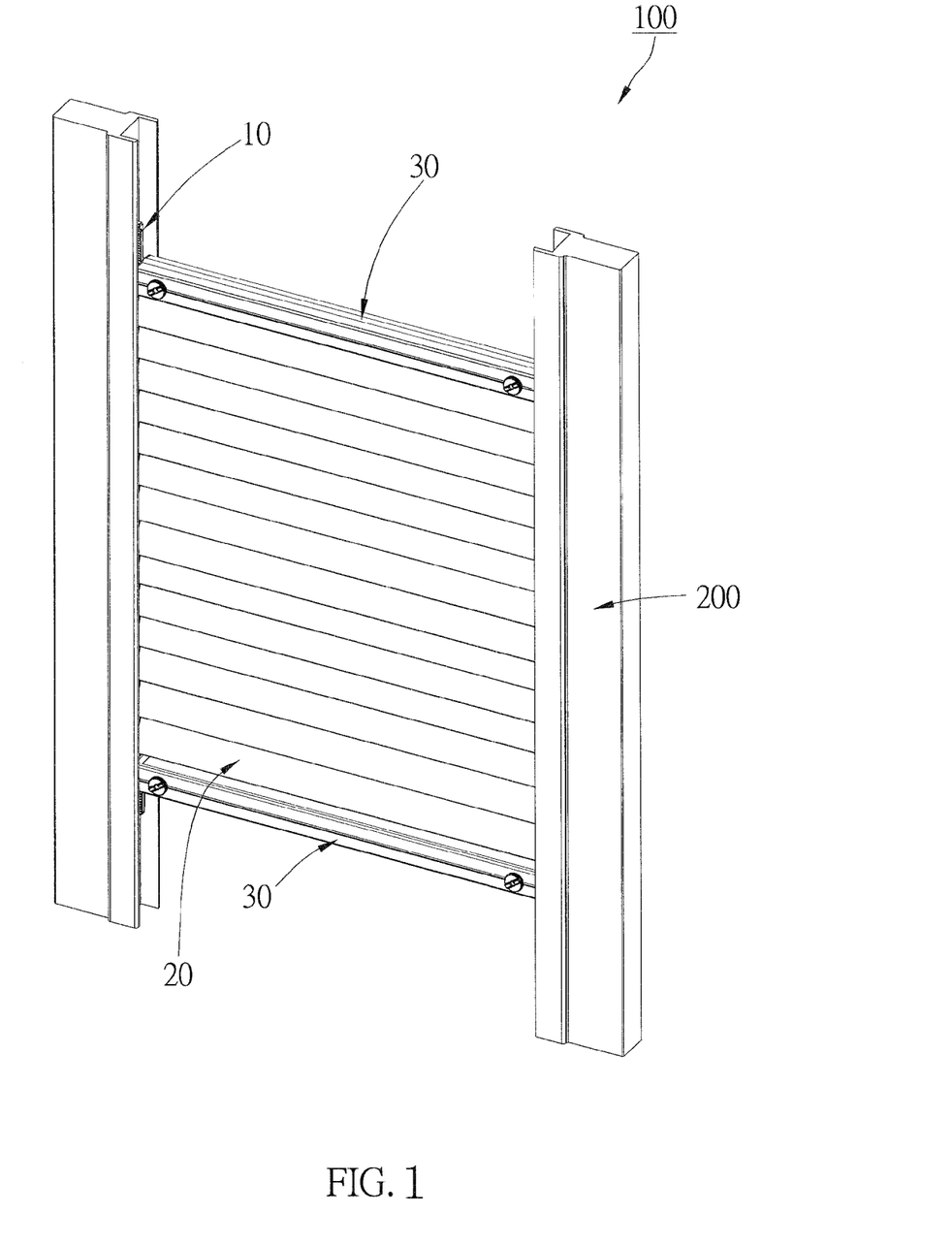
FIG. 1 is a perspective view of a first preferred embodiment of the present invention.
Figure 2:
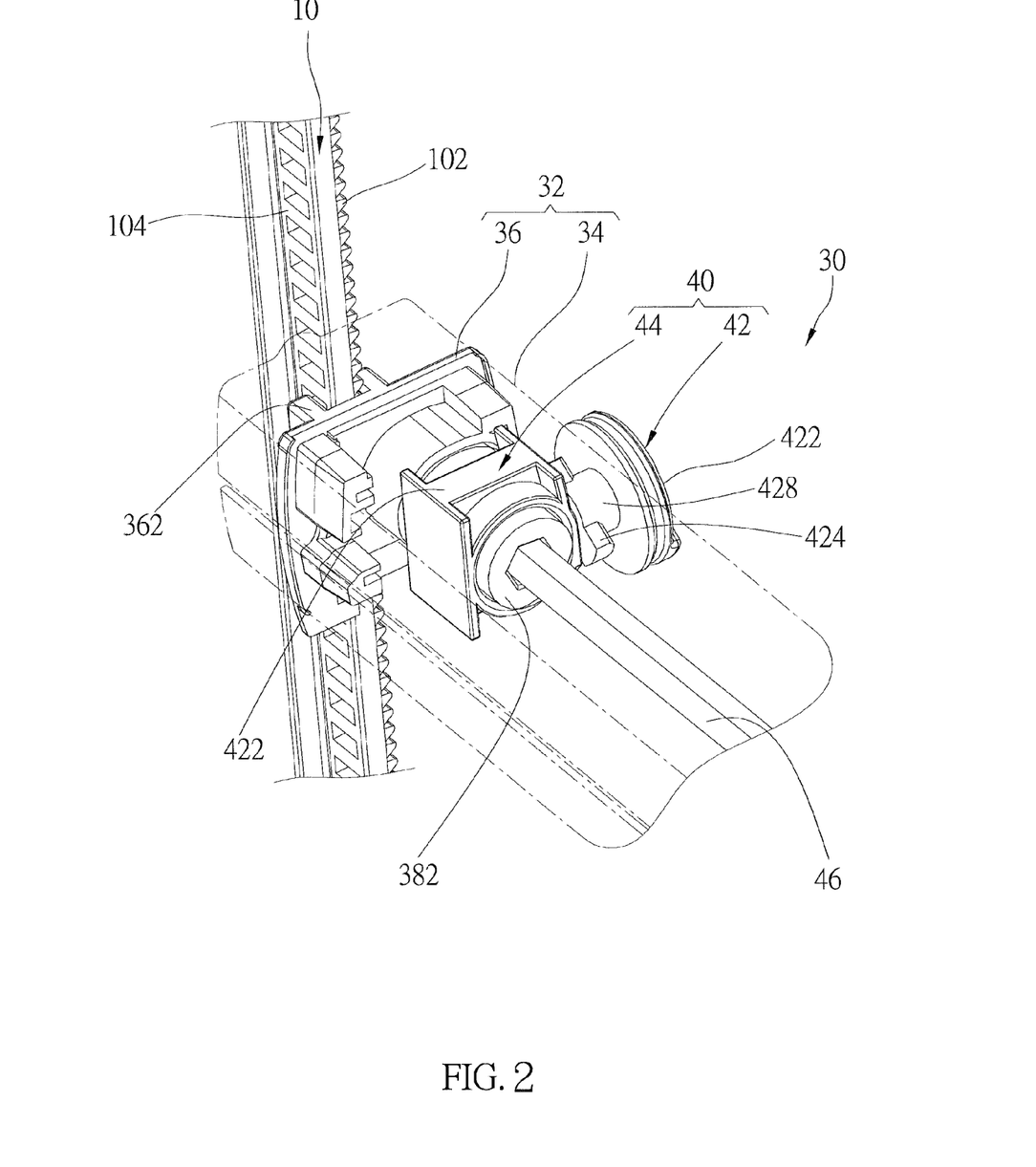
FIG. 2 is a perspective view of the coupling module of the first preferred embodiment of the present invention.
Figure 3:
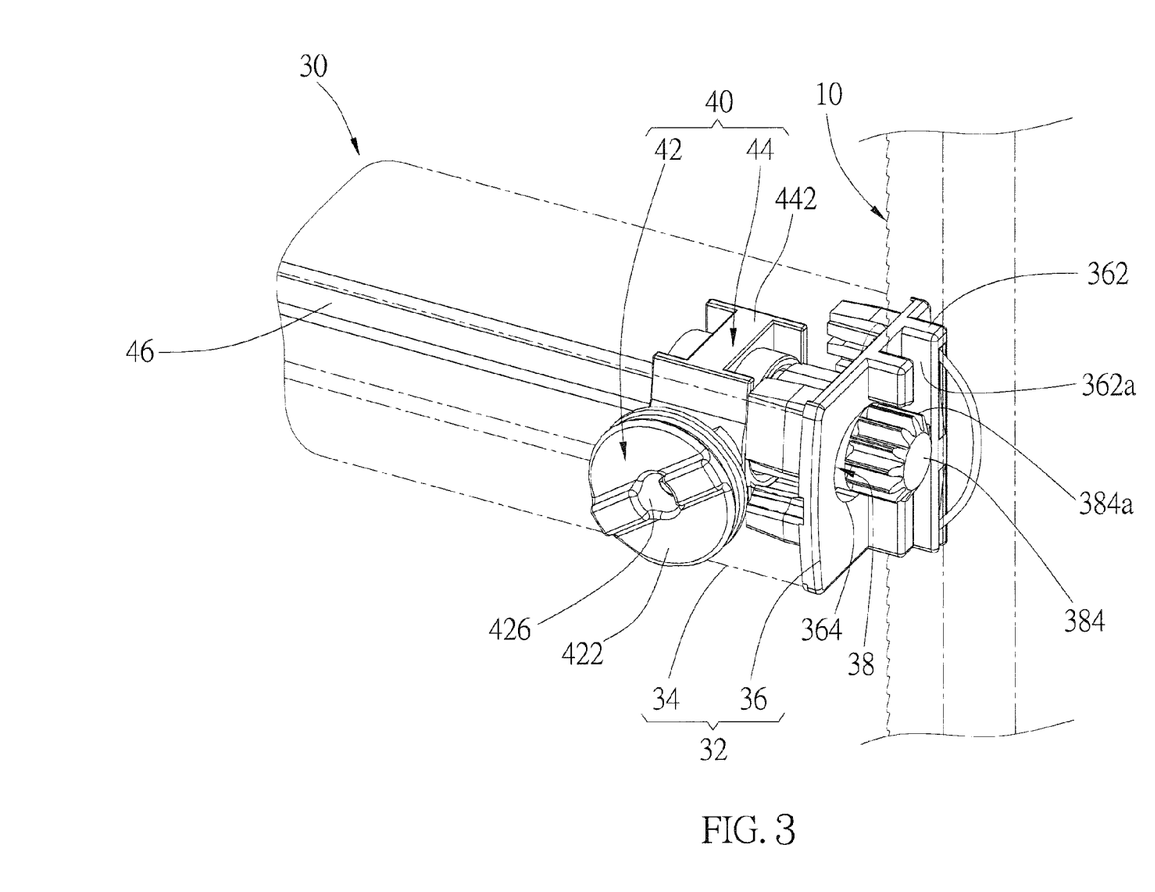
FIG. 3 is another perspective view of the coupling module of the first preferred embodiment of the present invention.
Figure 4:
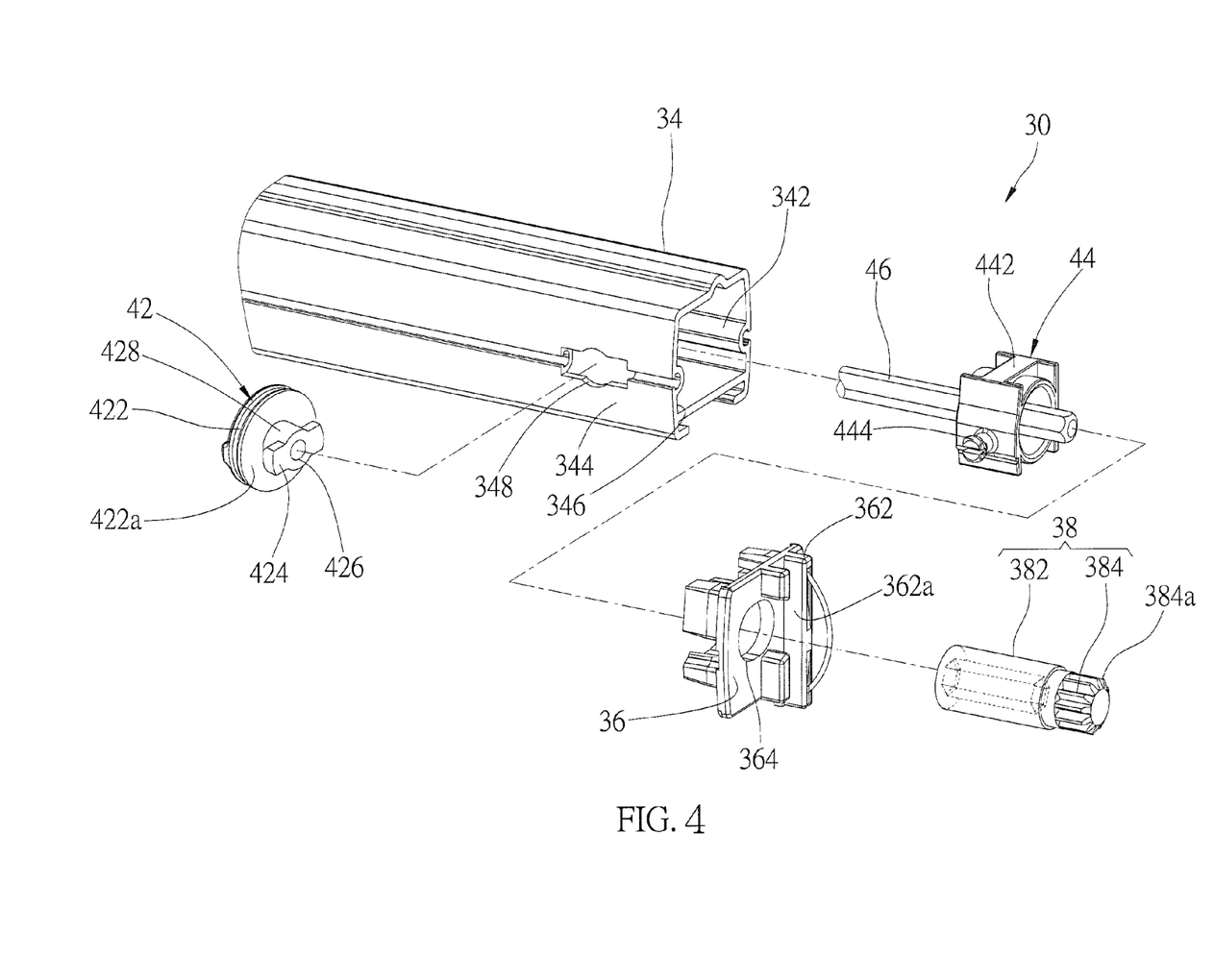
FIG. 4 is an exploded view of the coupling module of the first preferred embodiment of the present invention.

As shown in FIG. 1, a covering, especially a window covering 100, of the first preferred embodiment of the present invention includes two rails 10, a window covering blanket 20, and two coupling modules 30. The rails 10 are vertical and parallel to each other, and fixed to a covering frame 200. The coupling modules 30 have opposite ends engaging the rails 10 respectively. The window covering blanket 20 is between the coupling modules 30, and has its top and bottom ends connected to the coupling modules 30 respectively. The coupling modules 30 are the same, so are the rails 10, we only discuss one coupling modules 30 and one rails 10 hereafter.

As shown in FIG. 2 to FIG. 6, the rail 10 has a first side 102 and a second side 104 at opposite. On the first side 102 a rack is provided. The coupling module 30 has an elongated main member 32, two coupling devices 38, and two adjusting units 40. The main member 32 includes a bar-like rectangular frame 34 and two lids 36. The frame 34 has an axial direction and a radial direction, and the radial direction is perpendicular to the axial direction. The lids 36 respectively engage opposite ends of the frame 34 in the axial direction. The window covering blanket 20 is connected to the frame 34. The frame 34 has a hollow portion 342 therein, an exterior surface 344, and an interior surface 346. The frame 34 is provided with an elongated lateral bore 348 adjacent to the end thereof, and the lateral bore 348 is communicated with the hollow portion 342. Each lid 36 has a stop wall 362 and an elongated bore 364. The elongated bore 364 is parallel to the radial direction. The stop wall 362 has a first stop portion 362a to rest against the second side 104 of the rail 10, and the bore 364 is communicated with the hollow portion 342 of the frame 34.

The coupling devices 38 are received in the hollow portion 342 of the frame 34 and adjacent to opposite ends thereof respectively. Each coupling device 38 has a body 382 and an acting portion, which is a gear 384 in the embodiment, connected to the body 382. The gear 384 extends out of the frame 34 through the bore 364. Teeth of the gear 384 form a second stop portion 384a to engage the rack on the first side 102 of the corresponding rail 10. In the frame 34 a shaft 46 is received and has opposite ends connected to the bodies 382 of the coupling devices 38. The shaft 46 makes the gears 384 rotate simultaneously in order to move the main member 32 up and down along the rails 10.

The adjusting units 40 are provided to the frame 34 and connected to the coupling devices 38 respectively. Each adjusting unit 40 includes an operating member 42 and a connecting member 44. The operating member 42 has a first plate 422 and a second plate 424, the first plate 422 is round, and has an inner side 422a facing the exterior surface 344 of the frame 34. The first plate 422 is connected to the second plate 424 through a post 428, so that the first plate 422 is kept away from the second plate 424 for a distance. The operating member 42 has a through hole 426, which extends from the first plate 422, through the post 428, to the second plate 424. The second plate 424 is received in the hollow portion 342 of the frame 34, the first plate 422 is outside the frame 34, and the post 428 connects the second plate 424 to the first plate 422 through the lateral bore 348 of the frame 34.

The connecting member 44 includes a tube 442 and a locker 444. The tube 442 engages the body 382 of the coupling device 38. The locker 444 has an end connected to the tube 442, and the other end passing through the lateral bore 348 to engage the through hole 426 of the operating member 42. Thus the operating member 42 is moved in a direction parallel to the radial direction to move the coupling device 38 so as to move the gear 384 between a first position P1 (FIG. 5) and a second position P2 (FIG. 6). Precisely, the gear 384 is move in a direction parallel to the radial direction, or the gear 384 is moved in a direction vertical to the first stop face 362a of the stop wall 362, toward the first stop face 362a and away from the first stop face 362a.

Figure 5:
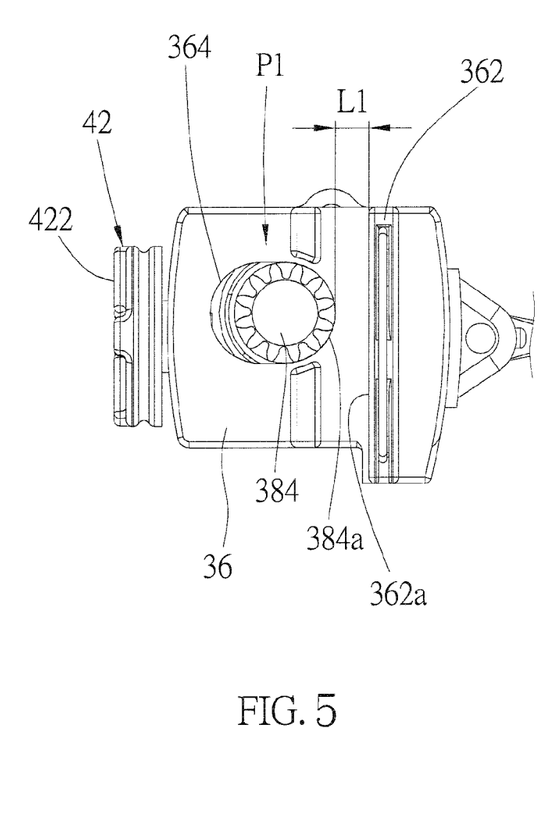
FIG. 5 is a right view of the coupling module of the first preferred embodiment of the present invention, showing the gear at the first position.
Figure 6:
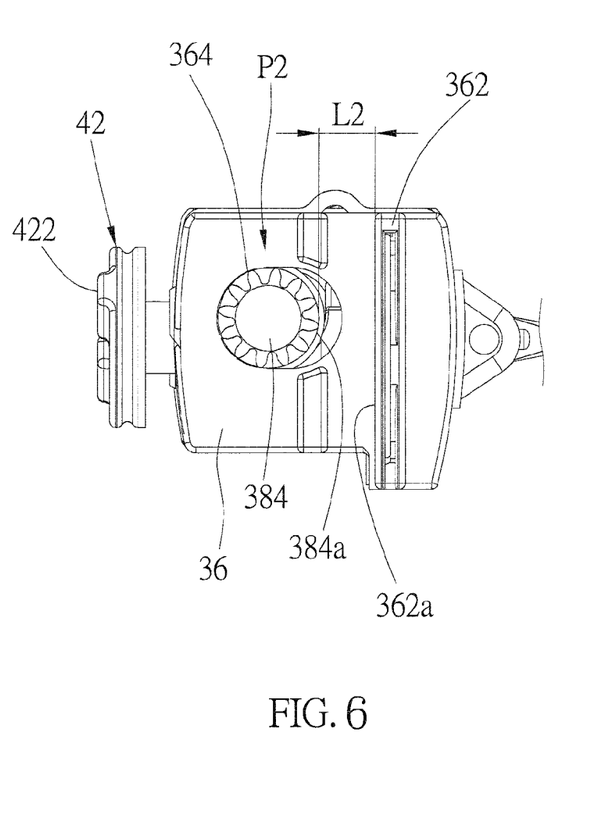
FIG. 6 is a right view of the coupling module of the first preferred embodiment of the present invention, showing the gear at the second position.
Figure 7:
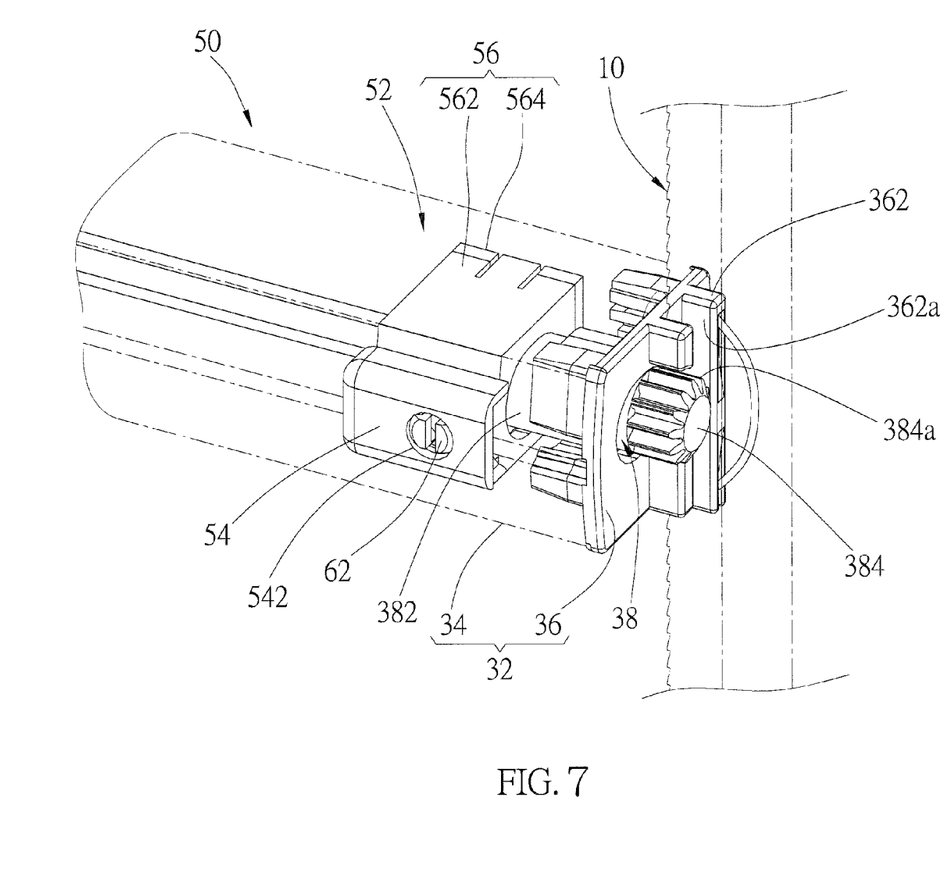
FIG. 7 is a perspective view of the coupling module of a second preferred embodiment of the present invention.
Figure 8:
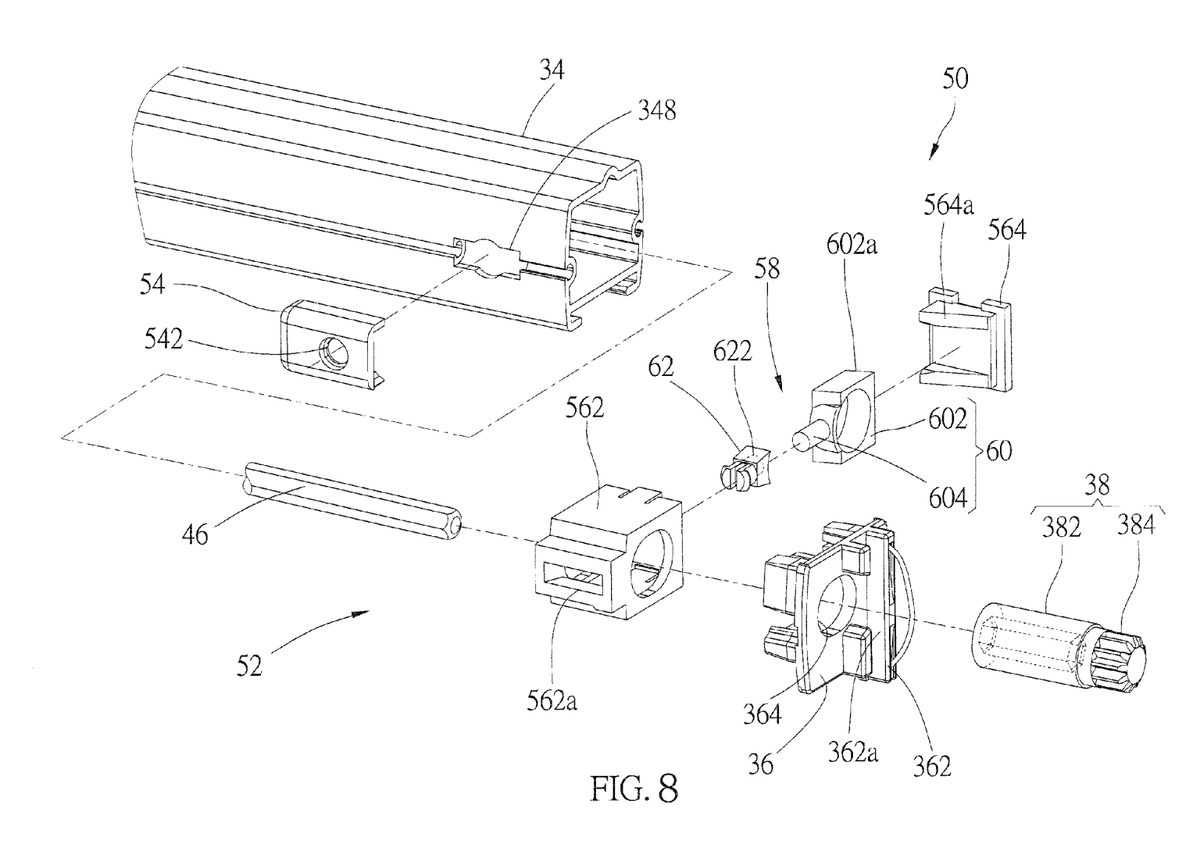
FIG. 8 is an exploded view of the coupling module of the second preferred embodiment of the present invention.
Figure 9:
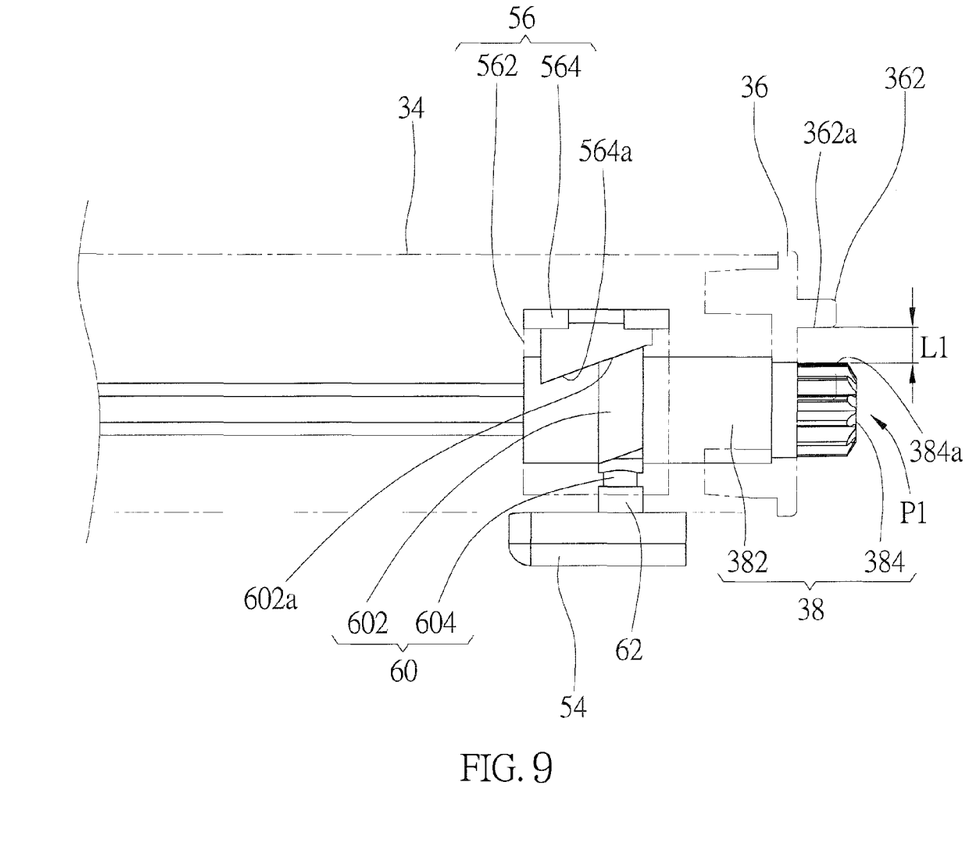
FIG. 9 is a top view of the coupling module of the second preferred embodiment of the present invention, showing the gear at the first position.

As shown in FIG. 5, while the operating member 42 is pressed (into the frame 34), the operating member 42 pushes the tube 442 inward to move the gear 384 of the coupling device 38 toward the stop wall 362 of the lid 36 and arrive at the first position P1. At this time, the first stop surface 362a is kept a first distance L1 from the second stop surface 384a, and the gear 384 and the stop wall 362 clamp the corresponding rail 10 while the gear 384 engages the rack of the rail 10. The coupling modules 30 could be moved up and down along the rails 10 to fold and unfold the window covering blanket 20. In addition, the operating member 42 is able to turn related to the locker 444. A length of the second plate 424 is longer than a width of the lateral bore 348 bit is shorter than a length of the lateral bore 348. The user may insert the second plate 424 into the lateral bore 348 to fit the locker 444 to the through hole 426, and then turn the operating member 42 for an angle to install the operating member 42, or uninstall the operating member 42 in a reverse way. When the second plate 424 abuts against the interior surface 346 of the frame 34, the operating member 42 is restricted from being moved outwardly. In this state, the window covering blanket 20 can be turned by moving the elongated main member 32 along the rails 10.

As shown in FIG. 6, while the operating member 42 is pulled (out of the frame 34), the operating member 42 moves the tube 442 toward the lateral bore 348 so as to move the gear 384 of the coupling device 38 away from the stop wall 362 and arrive at the second position P2. At this time, the first stop surface 362a is kept a second distance L2 from the second stop surface 384a, and the second distance L2 is longer than the first distance L1. As a result the gear 384 disengages the rack of the rail 10. In such condition, the coupling modules 30 and the window covering blanket 20 are free to be taken off the covering frame 200.

In conclusion, the window covering blanket 20 could be installed and uninstalled by pulling and pressing the operating member 42 without any tool.

FIG. 7 to FIG. 10 show a coupling module 50 of the second preferred embodiment, which is similar to the first embodiment, except that an adjusting unit 52 has an operating member 54, a base 56 and a coupling device 58. The operating member 54 is outside the frame 34 and has a through hole 542. The base 56 is received in the hollow portion 342 of the frame 34. The base 56 has a base frame 562 and a cover 564. The cover 564 has two inclined faces 564a facing the base frame 562. Each inclined face 564a slopes toward the lid 36, in other words, a distance between the lateral bore 348 of the frame 34 and each inclined face 564a gradually increases in a direction toward the lid 36. The coupling device 58 is received in the base frame 562 of the base 56 and has a tube 60 and a locker 62. The tube 60 has a tubular member 602 and a post 604 connected to the tubular member 602 in the radial direction. The tubular member 602 is provided with an inclined face 602a on an outer surface thereof. The inclined face 602a of the tube 60 rests against the inclined faces 564a of the cover 564. The tubular member 602 engages the body 382 of the coupling device 38. The locker 62 has a coupling bore 622 to engage the post 604. The locker 62 passes through a slot 562a on the base 56 and the lateral bore 348 of the frame 34 to engage the through hole 542 of the operating member 54.

Figure 10:
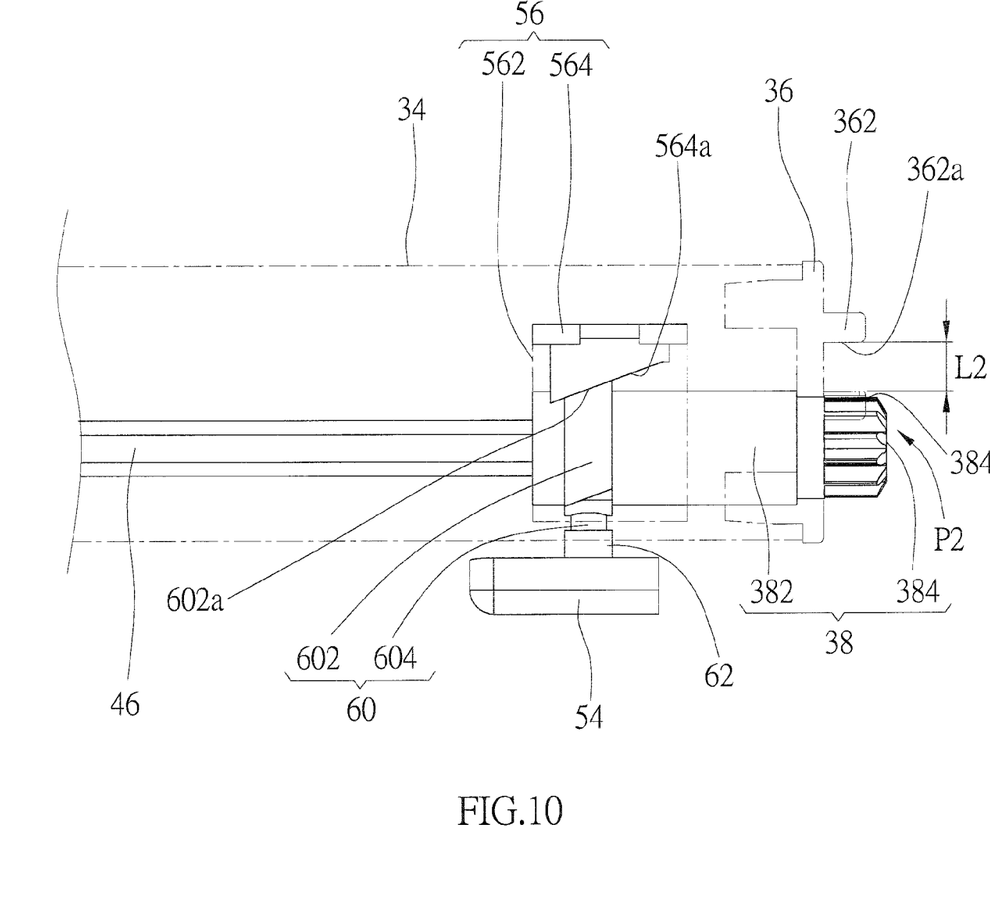
FIG. 10 is a right view of the coupling module of the second preferred embodiment of the present invention, showing the gear at the second position.

With the design as described above, the gear 384 is moved between the first position P1 and the second position P2 while the operating member 54 is reciprocated in a direction parallel to the axial direction. Precisely, the gear 384 is moved to the first position P1 (FIG. 9) by moving the operating member 54 toward the lid 36, and moved to the second position P2 (FIG. 10) by moving the operating member 54 in the opposite direction. While the gear 384 is moved to the first position P1 (FIG. 9), the gear 384 is kept a first distance L1 from the stop wall 362, and it is a second distance L2 between the gear 384 and the stop wall 362 while the gear 384 is moved to the second position P2 (FIG. 10). The second distance L2 is longer than the first distance L1. The gear 384 engages the rack of the rail 10 and clamps the rail 10 with the stop wall 362, and the coupling modules 50 are able to move along the rails while the gear 384 is at the first position P1. The coupling modules 50 and the window covering blanket 20 are able to be taken off the rails 10 or installed onto the rails 10 while the gear 384 is at the second position P2.

It must be pointed out that the embodiments described above are only some preferred embodiments of the present invention. All equivalent structures which employ the concepts disclosed in this specification and the appended claims should fall within the scope of the present invention.

What is claimed is:

1. A coupling module of a covering, comprising:
an elongated main member, which has an axial direction through opposite ends thereof and a radial direction perpendicular to the axial direction, having a stop wall at one of the opposite ends thereof, wherein the stop wall has a first stop surface;
a coupling device movably connected to the main member and having a second stop surface facing the first stop face of the main member;
an adjusting unit connecting to the coupling device to move the coupling device between a first position and a second position, wherein the coupling device is moved in a direction parallel to the radial direction, and a distance between the first stop surface and the second stop surface when the coupling device is at the first position is shorter than that between the first stop surface and the second stop surface when the coupling device is at the second position;
wherein the main member has a hollow portion therein and a bore on the end thereof, and the bore is communicated with the hollow portion; the coupling device is received in the hollow portion of the main member and has an acting portion extending out of the main member via the bore; the acting portion has the second stop surface;
wherein the main member includes a frame and a lid; the frame has the hollow portion, and the lid is connected to an end of the frame; the lid has a stop wall and the bore; and
wherein the frame has a lateral bore communicated with the hollow portion; the adjusting unit has an operating member and a connecting member; the connecting member is received in the hollow portion of the frame, and the operating member is outside the frame and connected to the connecting member through the lateral bore; the operating member is reciprocated in a direction parallel to the radial direction of the main member to move the coupling device between the first position and the second position.

2. The coupling module of claim 1, wherein the operating member has a through hole; the connecting member has a tube and a locker; the tube directly engages the coupling device, and the locker has an end connected to the tube and an opposite end engaging the through hole of the operating member through the lateral bore.

3. The coupling module of claim 2, wherein the frame has an interior surface and an exterior surface; the lateral bore is open at both the interior surface and the exterior surface; the operating member has a first plate and a second plate; the first plate is outside the frame, and the second plate is received in the hollow portion of the frame; the second plate is connected to the first plate through the lateral bore; a length of the second plate is longer than a width of the lateral bore and shorter than a length of the lateral bore; the operating member is rotated related to the locker to engage and disengage the second plate with the lateral bore.

4. A coupling module of a covering, comprising:
an elongated main member, which has an axial direction through opposite ends thereof and a radial direction perpendicular to the axial direction, having a stop wall at one of the opposite ends thereof, wherein the stop wall has a first stop surface;
a coupling device movably connected to the main member and having a second stop surface facing the first stop face of the main member;
an adjusting unit connecting to the coupling device to move the coupling device between a first position and a second position, wherein the coupling device is moved in a direction parallel to the radial direction, and a distance between the first stop surface and the second stop surface when the coupling device is at the first position is shorter than that between the first stop surface and the second stop surface when the coupling device is at the second position;
wherein the main member has a hollow portion therein and a bore on the end thereof, and the bore is communicated with the hollow portion; the coupling device is received in the hollow portion of the main member and has an acting portion extending out of the main member via the bore; the acting portion has the second stop surface;
wherein the main member includes a frame and a lid; the frame has the hollow portion, and the lid is connected to an end of the frame; the lid has a stop wall and the bore; and
wherein the frame has an elongated lateral bore communicated with the hollow portion; the adjusting unit has an operating member, a base, and a connecting member; the operating member is outside the frame, the base is received in the hollow portion of the frame and connected to the coupling device, and the connecting member is received in the hollow portion of the frame and connected to the operating member through the lateral bore; the base has an inclined face, and the inclined face slopes toward the lid, so that a distance between the lateral bore and the inclined face gradually increases in a direction toward the lid; the connecting member rests against the inclined face; the operating member is reciprocated along the lateral bore to move the coupling device between the first position and the second position.

5. The coupling module of claim 4, wherein the base has a base frame and a cover; the connecting member is received in the base frame, and the cover has the inclined face.

6. The coupling module of claim 4, wherein the operating member has a through hole; the connecting member has a tube and a locker; the tube directly engages the coupling device, and the locker engages the through hole of the operating member through the lateral hole; the tube has an inclined face resting against the inclined face of the base.

7. The coupling module of claim 6, wherein the tube has a tubular member and a post connected to the tubular member; the locker has a coupling bore to engage the post, and the tubular member has the inclined face.

* * * * *